United States Patent
Cambre et al.

(10) Patent No.: US 7,492,261 B2
(45) Date of Patent: *Feb. 17, 2009

(54) CONTROL SYSTEM FOR AN RFID-BASED SYSTEM FOR ASSEMBLING AND VERIFYING OUTBOUND SURGICAL EQUIPMENT CORRESPONDING TO A PARTICULAR SURGERY

(75) Inventors: Christopher David Cambre, Collierville, TN (US); Chad Wendel Chun, Hernando, MS (US); Robert Varner, Germantown, TN (US); Amy Shettler, Collierville, TN (US); Steven M. Tethrake, Collierville, TN (US)

(73) Assignee: Warsaw Orthopedic, Inc.

( * ) Notice: Subject to any disclaimer, the term of this patent is extended or adjusted under 35 U.S.C. 154(b) by 246 days.

This patent is subject to a terminal disclaimer.

(21) Appl. No.: 11/530,105

(22) Filed: Sep. 8, 2006

(65) Prior Publication Data
US 2007/0001839 A1 Jan. 4, 2007

Related U.S. Application Data

(63) Continuation-in-part of application No. 10/993,487, filed on Nov. 22, 2004, now Pat. No. 7,227,469.

(51) Int. Cl.
G08B 13/14 (2006.01)
(52) U.S. Cl. .................. 340/572.1; 340/676
(58) Field of Classification Search .......... 340/676, 340/571.2; 128/604; 235/375, 385
See application file for complete search history.

(56) References Cited

U.S. PATENT DOCUMENTS

| | | | |
|---|---|---|---|
| 4,075,632 A | 2/1978 | Baldwin et al. | |
| 4,360,801 A | 11/1982 | Duhame | |
| 4,390,880 A | 6/1983 | Henoch | |
| 4,688,026 A | 8/1987 | Scribner et al. | |
| 4,739,328 A | 4/1988 | Koelle et al. | |
| 5,030,807 A | 7/1991 | Landt et al. | |

(Continued)

OTHER PUBLICATIONS

Presentation by Innovision Research and Technology, PLC at the "RFID in Healthcare" conference in Washington, DC on Dec. 2 and 3, 2003.

(Continued)

*Primary Examiner*—Daniel Wu
*Assistant Examiner*—Shirley Lu

(57) ABSTRACT

A control system for an RFID-based system for assembling and verifying outbound surgical equipment corresponding to a particular surgery. A user enters a identification number of a surgery. The control system queries a database of surgery information and outputs a list of required surgical equipment, such as surgical instrument sets. An operator uses the list to pick instrument sets for loading into a shipping tote. Each set is tagged with an RFID inventory tag that stores identification information for that set such as a set name and ID number. The shipping tote is passed through an RFID reader and identification data read from the tags is compared against the identification data for sets required for that surgery. A status indicator is activated to alert a user as to whether the surgery is complete that is, all expected sets are present, or that exception handling is required. The control system updates a database such as an ERP system to reflect that the surgery including the required sets has shipped—and the sets are inventoried out to the intended recipient.

20 Claims, 7 Drawing Sheets

U.S. PATENT DOCUMENTS

| | | | |
|---|---|---|---|
| 5,621,199 | A | 4/1997 | Calari et al. |
| 5,923,001 | A | 7/1999 | Morris et al. |
| 5,963,134 | A | 10/1999 | Bowers et al. |
| 6,158,437 | A | 12/2000 | Vagley |
| 6,164,738 | A | 12/2000 | Dane et al. |
| 6,193,160 | B1 | 2/2001 | Zembitski |
| 6,318,636 | B1 | 11/2001 | Reynolds et al. |
| 6,405,863 | B1 | 6/2002 | Dhindsa |
| 6,415,978 | B1 | 7/2002 | McAllister |
| 6,426,041 | B1 | 7/2002 | Smith |
| 6,429,776 | B1 | 8/2002 | Alicot et al. |
| 6,480,101 | B1 | 11/2002 | Kelly et al. |
| 6,523,752 | B2 | 2/2003 | Nishitani et al. |
| 6,646,241 | B1 | 11/2003 | Varma et al. |
| 6,669,089 | B2 | 12/2003 | Cybulski et al. |
| 6,777,623 | B2 | 8/2004 | Ballard |
| 6,825,766 | B2 | 11/2004 | Hewitt et al. |
| 6,853,303 | B2 | 2/2005 | Chen et al. |
| 6,861,954 | B2 | 3/2005 | Levin |
| 6,866,147 | B2 | 3/2005 | Barwick |
| 7,012,529 | B2 * | 3/2006 | Sajkowsky ............... 340/572.1 |
| 2002/0032435 | A1 | 3/2002 | Levin |
| 2002/0063622 | A1 | 5/2002 | Armstrong |
| 2002/0105424 | A1 | 8/2002 | Alicot et al. |
| 2002/0143320 | A1 | 10/2002 | Levin |
| 2002/0188259 | A1 | 12/2002 | Hickle et al. |
| 2003/0164401 | A1 | 9/2003 | Andreasson et al. |
| 2003/0174099 | A1 | 9/2003 | Bauer et al. |
| 2003/0189094 | A1 | 10/2003 | Trabitz |
| 2003/0196837 | A1 | 10/2003 | Ballard |
| 2004/0008123 | A1 | 1/2004 | Carrender et al. |
| 2004/0022227 | A1 | 2/2004 | Lynch et al. |
| 2004/0031626 | A1 | 2/2004 | Morris et al. |
| 2004/0069851 | A1 | 4/2004 | Grunes et al. |
| 2004/0100384 | A1 | 5/2004 | Chen et al. |
| 2004/0160233 | A1 | 8/2004 | Forster |
| 2004/0174244 | A1 | 9/2004 | Eidemiller |
| 2004/0174261 | A1 | 9/2004 | Volpi et al. |
| 2004/0220602 | A1 | 11/2004 | Deng et al. |
| 2004/0220860 | A1 | 11/2004 | Persky et al. |
| 2004/0250819 | A1 | 12/2004 | Blair et al. |
| 2004/0267297 | A1 | 12/2004 | Malackowski et al. |
| 2005/0003757 | A1 | 1/2005 | Anderson |
| 2005/0012617 | A1 | 1/2005 | DiSilvestro et al. |
| 2005/0138469 | A1 * | 6/2005 | Ryan et al. .................... 714/20 |

OTHER PUBLICATIONS (http://rfidjournal.com/article/view/112) RFID Journal "Can RFID Cure Healthcare's Ills?", Nov. 12, 2002.

(http://usatoday.printthis.clickability.com/pt/cp?action=cpt&expire=&urlID=8067862&fb=..) Svensson, Peter "Conductive ink advances electronics," USAToday.com (New York) pages 1-3.

(http://www.eetimes.com/showPressRelease.jhtml?articleID=57907) EE times (www.eetimes.com) "T-Ink™ Unique Conductive Ink Technology to be featured" Feb. 14, 2003, pp. 1-2.

(http://americanprinter.com/microsites/magazinearticle.asp?mode=print&magazinearticleid..) American Printer (www.americanprinter.com) "Tracking RFID Progress" Jan. 1, 2004, pp. 1-3.

(http://pfcc-online.com/microsites/newsarticle.asp?mode=print&newsarticleid=2708965&re) Byrd-Thompson, Nsenga, (PFFC) Paper Film & Foil Converter (www.pffc-online-com), "RFID and Conductive Inks: What You Need to Know" pp. 1-3.

* cited by examiner

FIG. 6

| SURGERY NUMBER | | 123456 | |
|---|---|---|---|
| CURRENT SHIPPING STATUS | | INCOMPLETE | |

| EXPECTED AIR BILLS | | TOTES READ COUNT | |
|---|---|---|---|
| AIR BILL 1 | 5621101 | 0 | |
| AIR BILL 2 | 5621102 | | |
| AIR BILL 3 | 5621103 | TRAYS PER CURRENT TOTE | |
| AIR BILL 4 | | | |
| AIR BILL 5 | | 0 | |

EXPECTED SETS

| | ID NUMBER | NAME | STATUS |
|---|---|---|---|
| SET 1 | 02655 | Scalpel Set | 2 |
| SET 2 | 02476 | Clamp Set | 2 |
| SET 3 | 03551 | Small Drill Set | 2 |
| SET 4 | 03098 | Suitcase 200 | 2 |
| SET 5 | 03142 | Suitcase 300 | 2 |
| SET 6 | 02319 | Extra Set | 2 |
| SET 7 | 04918 | Heavy Set | 2 |
| SET 8 | 01391 | Retractor Set | 2 |
| SET 9 | 04778 | Saw Set | 2 |
| SET 10 | | | |
| SET 11 | | | |
| SET 12 | | | |

SETS FOUND NOT ASSOCIATED TO SURGERY

| SET 1 | | | |
|---|---|---|---|
| SET 2 | | | |
| SET 3 | | | |
| SET 4 | | | |
| SET 5 | | | |

| SURGERY NUMBER | | 123456 | |
|---|---|---|---|
| CURRENT SHIPPING STATUS | | INCOMPLETE | |
| EXPECTED AIR BILLS | | TOTES READ COUNT | |
| AIR BILL 1 | 5621101 | 1 | |
| AIR BILL 2 | 5621102 | | |
| AIR BILL 3 | 5621103 | TRAYS PER CURRENT TOTE | |
| AIR BILL 4 | | | |
| AIR BILL 5 | | 3 | |
| EXPECTED SETS | | | |
| | ID NUMBER | NAME | STATUS |
| SET 1 | 02655 | Scalpel Set | 2 |
| SET 2 | 02476 | Clamp Set | 2 |
| SET 3 | 03551 | Small Drill Set | 2 |
| SET 4 | 03098 | Suitcase 200 | 2 |
| SET 5 | 03142 | Suitcase 300 | 2 |
| SET 6 | 02319 | Extra Set | 2 |
| SET 7 | 04918 | Heavy Set | 2 |
| SET 8 | 01391 | Retractor Set | 2 |
| SET 9 | 04778 | Saw Set | 2 |
| SET 10 | | | |
| SET 11 | | | |
| SET 12 | | | |
| SETS FOUND NOT ASSOCIATED TO SURGERY | | | |
| SET 1 | | | |
| SET 2 | | | |
| SET 3 | | | |
| SET 4 | | | |
| SET 5 | | | |

FIG. 8

| SURGERY NUMBER | | 123456 | |
|---|---|---|---|
| CURRENT SHIPPING STATUS | | COMPLETE | |

| EXPECTED AIR BILLS | | TOTES READ COUNT | |
|---|---|---|---|
| AIR BILL 1 | 5621101 | 3 | |
| AIR BILL 2 | 5621102 | | |
| AIR BILL 3 | 5621103 | TRAYS PER CURRENT TOTE | |
| AIR BILL 4 | | | |
| AIR BILL 5 | | 3 | |
| EXPECTED SETS | | | |

| | ID NUMBER | NAME | STATUS |
|---|---|---|---|
| SET 1 | 02655 | Scalpel Set | 2 |
| SET 2 | 02476 | Clamp Set | 2 |
| SET 3 | 03551 | Small Drill Set | 2 |
| SET 4 | 03096 | Suitcase 200 | 2 |
| SET 5 | 03142 | Suitcase 300 | 2 |
| SET 6 | 02319 | Extra Set | 2 |
| SET 7 | 04918 | Heavy Set | 2 |
| SET 8 | 01391 | Retractor Set | 2 |
| SET 9 | 04778 | Sew Set | 2 |
| SET 10 | | | |
| SET 11 | | | |
| SET 12 | | | |

| SETS FOUND NOT ASSOCIATED TO SURGERY | | | |
|---|---|---|---|
| SET 1 | | | |
| SET 2 | | | |
| SET 3 | | | |
| SET 4 | | | |
| SET 5 | | | |

CONTROL SYSTEM FOR AN RFID-BASED SYSTEM FOR ASSEMBLING AND VERIFYING OUTBOUND SURGICAL EQUIPMENT CORRESPONDING TO A PARTICULAR SURGERY

CROSS REFERENCE TO RELATED APPLICATION(S)

This application is a continuation-in-part of U.S. patent application Ser. No. 10/993,487 entitled "Surgical Instrument Tray Shipping Tote Identification System and Methods of Using Same," filed Nov. 22, 2004 now U.S. Pat. No. 7,227,469, the disclosure of which is hereby incorporated by reference in its entirety.

FIELD OF THE INVENTION

The invention generally relates to systems and methods for implementing radio frequency identification techniques, and more particularly to control systems for an RFID-based system for assembling and verifying outbound surgical equipment corresponding to a particular surgery.

BACKGROUND OF THE INVENTION

Surgical instrument storage and sterilization systems are known. These systems, sometimes referred to as surgical instrument trays or surgical instrument kits/sets, typically consist of metal or plastic trays that hold a variety of general purpose and/or procedure specific surgical instruments such as forceps, scissors, clamps, retractors, scalpels, etc. These trays are brought into the operating room (OR) when preparing for surgery, and also are used as a means to organize, transport and store surgical instruments in a medical facility as well as to house instruments during sterilization.

Often medical facilities do not sterilize and maintain their own surgical instrument kits. In this case, sterilization, maintenance and other instrument operations are performed at a centralized location such as an instrument company's distribution center. In order to move multiple surgical instruments trays between such distribution centers and user sites such as hospitals, universities and other medical facilities, several trays are transported in a containers known as shipping totes. A shipping tote is usually a large bin, made of plastic or other durable, lightweight material that is sized of suitable dimensions to carry two or more instrument trays inside. Carrying multiple trays in a single tote reduces the number of manual operations that must be performed in processing instrument trays. Furthermore, instrument trays intended for a particular location and/or surgical procedure may be grouped together. Shipping totes also permit transport by conventional courier, allowing processing facilities to contract out delivery and pickup to Federal Express, UPS, the USPS or other courier companies.

Before transporting a shipping tote, a bar coded shipping label is sometimes prepared that identifies certain information relevant to the shipment such as the point of origin, the destination, and possibly the contents of the tote, i.e., the identification number of each surgical instrument tray contained in the tote. The bar coded label allows the tote to be easily and efficiently tracked and entered into or out of inventory at the processing facility. These labels are sometimes referred to as "air bills."

As the cost, complexity and number and number of surgical instruments increases, businesses continue to look to automated techniques to increase efficiency and reduce operating overhead. Recently, radio frequency identification (RFID) techniques have become popular as an inventory and tracking technology because RFID does not require line of sight and is capable of storing more information than a bar code label. However, even with such technology, their exists a need for control systems that can integrate such new technologies with existing inventory and business intelligence systems.

The description herein of various advantages and disadvantages associated with known apparatus, methods, and materials is not intended to limit the scope of the invention to their exclusion. Indeed, various embodiments of the invention may include one or more of the known apparatus, methods, and materials without suffering from their disadvantages.

SUMMARY OF THE INVENTION

Therefore, in view of the foregoing, there exists a need to provide a control system for an RFID-based system for assembling and verifying outbound surgical equipment corresponding to a particular surgery that increases throughput, reduces human errors, increases accuracy, reduces handling costs, consolidates inventory records and provides accurate and rapid processing of outbound surgical instrument sets.

Embodiments of the present invention mitigate or solve the above-identified limitations in known solutions, as well as other unspecified deficiencies in known solutions. A number of advantages associated with various embodiments of the present invention are readily evident to those skilled in the art, including economy of design and resources, transparent operation, cost savings, etc. Various exemplary embodiments according to the methods and apparatus of the present invention allow for lower handling costs of surgical instruments, increased accuracy of the verification process of data pertaining to each instrument tray and shipping tote with a reduction of human contact, and provide real-time data collection resulting in fast data acquisition, which ultimately speeds up inventory of such instrument trays and totes.

In accordance with one embodiment of the present invention, a system for assembling and verifying outbound surgical equipment corresponding to a particular surgery is provided. The system according to this embodiment comprises a data processor adapted to receive a data input comprising an identification number of a surgical procedure, a communications link coupled to the data processor adapted to query a database using at least the identification number of the surgical procedure, a user interface adapted to display information corresponding to surgical equipment required for that surgical procedure, a container adapted to contain the corresponding surgical equipment, an RFID reader adapted to read identification information from RFID tags attached to the surgical equipment and to supply the read information to the data processor, and a status indicator adapted to provide a status indication to a user, wherein the status indicator indicates to a user a status of the surgical equipment for the surgical procedure based on a determination by the data processor.

Another exemplary embodiment of the invention provides a computer readable storage medium containing computer readable instructions stored therein for operating a system for assembling and verifying outbound surgical equipment corresponding to a particular surgery. The computer readable storage medium according to this embodiment comprises instructions for receiving a first data input identifying a surgical procedure, instructions for querying a database using the first data input, instructions for outputting a list of surgical equipment associated with the particular surgery, instructions for activating an RFID reader to read identification information from surgical equipment placed in proximity to the RFID reader, instructions for comparing the identification information with identification information associated with the list of surgical equipment, and instructions for activating an indicator based on a results of comparing.

In another exemplary embodiment, a control system for a system for assembling and verifying outbound surgical equipment corresponding to a particular surgical procedure is provided. The control system according to this embodiment comprises a data input module for receiving a user input indicative of a identification number of a surgical procedure, a database module storing a plurality of surgical procedures and a list of surgical equipment associated with each procedure, a data processor module adapted to query the database module using the data input to determine a list of required surgical equipment, an output module adapted to output the list of surgical equipment so that a user can pick the required equipment, an RFID reader module adapted to acquire identification information from RFID tags associated with each item of surgical equipment and to provide the identification information to the data processor module to be compared against identification information of equipment on the list, and a status indication module adapted to output a status of the surgical procedure based on results of the comparison, wherein the status indicates whether the surgical procedure is ready for shipping or that exception handling is required.

Other aspects and advantages of the invention will become apparent from the following detailed description, taken in conjunction with the accompanying drawings, illustrating by way of example the principles of the invention.

BRIEF DESCRIPTION OF THE DRAWINGS

Purposes and advantages of the present invention will be apparent to those of ordinary skill in the art from the following detailed description in conjunction with the appended drawings in which like reference characters are used to indicate like elements, and in which:

FIG. 6 is an exemplary screen shot of an interface of a control system for assembling and verifying outbound surgical equipment corresponding to a particular surgery according to at least one embodiment of this invention;

FIG. 7 is another exemplary screen shot of an interface of a control system for assembling and verifying outbound surgical equipment corresponding to a particular surgery according to at least one embodiment of this invention; and FIG. 8 is yet another exemplary screen shot of an interface of a control system for assembling and verifying outbound surgical equipment corresponding to a particular surgery according to at least one embodiment of this invention.

DETAILED DESCRIPTION OF THE DISCLOSURE

Figure 1:
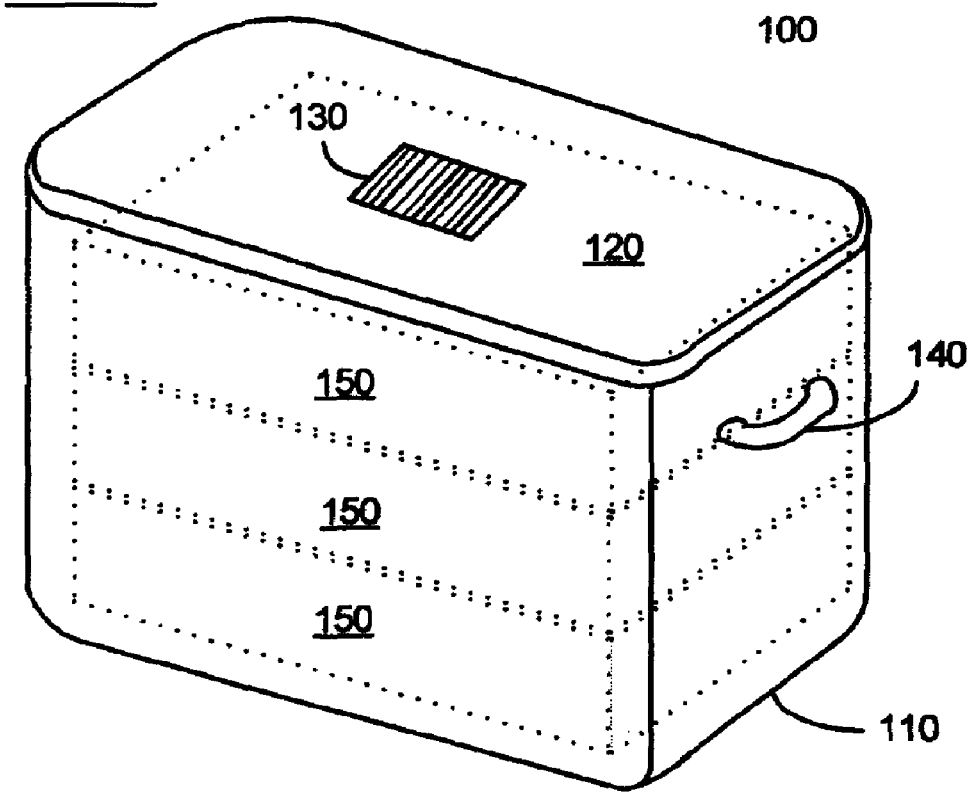
FIG. 1 is a perspective view of a instrument tray shipping tote usable with various embodiments of the invention.

The following description is intended to convey a thorough understanding of the invention by providing specific embodiments and details involving systems and methods of processing outbound surgical instrument tray shipping totes and control and/or operating systems for systems for processing outbound surgical instrument tray shipping totes corresponding to a particular surgery. It is understood, however, that the invention is not limited to these specific embodiments and details, which are exemplary only. It further is understood that one possessing ordinary skill in the art, in light of known systems and methods, would appreciate the use of the invention for its intended purposes and benefits in any number of alternative embodiments, depending upon specific design and other needs.

As used herein, the expressions "RFID tag" and "RFID transponder tag" will refer to any active or passive type of electronic data storage device, read-only or read and write, that is wirelessly activated in the presence of a radio frequency (RF) field, including any currently available inductively coupled RFID tags, capacitively coupled RFID tags and even future RF-type tags not yet available. This includes tags operating in the 125 kHz, 13.56 MHz, 868-927 MHz, 2.45 GHz and 5.8 GHz frequency bands as well as other suitable frequency bands. Also, the tag may be a silicon-type IC tag, a printed tag printed with a conductive ink-based printing process or a tag formed by other suitable means. The RFID tag circuit typically includes an antenna, processor and memory structure. The tag circuit is able to receive the signal, recover the encoded information and store that information in the non-volatile memory structure so that it can be wirelessly accessed by RFID reader devices.

Through out this description, the expression "RFID-based control system for assembling and verifying outbound surgical equipment" will be given broad meaning including, but not limited to, any type of control system running on a data processors that may include handheld, portable, or stationary device components and may consist of a single unitary structure or separate structures in communication with one another, that is capable of receiving a data input indicative of a surgery identification number, querying a database using the data input, retrieving and outputting information associated with the data input including identification information of surgical instrument trays expected to be associated with the surgery identification number, receiving an RF input from each RFID-tagged instrument tray brought into proximity with an attached RFID reader and to output a status to an operator as to whether the current surgery is complete or requires additional except handling. The control system may be an operating system stored in a magnetic recording medium, may be firm wave programmed into programmable logic, an embedded operating system executed by an embedded processor or other suitable operating system. The specific code of the control system may be written in one or more of any known programming languages, including UNIX, C, C++, JAVA, FORTRAN, LabView, Vbasic, or a rapid application development (RAD) platform, etc.

Figure 2:
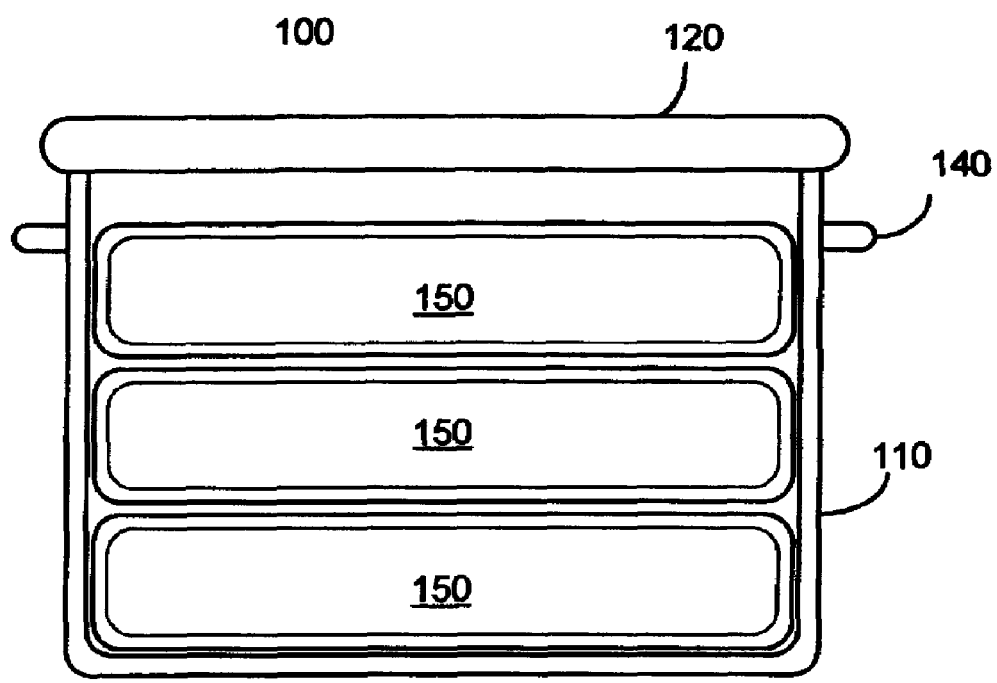
FIG. 2 is a cutaway profile view of the surgical instrument tray shipping tote of FIG. 1.

Referring now to FIGS. 1 and 2, these figures illustrate perspective and side cut-away views respectively of a surgical instrument kit shipping tote 100 for transporting multiple of surgical instrument kits, such as, for example, in and out of a distribution and processing center in accordance with various embodiments. The shipping tote 100 preferably comprises a main body portion 110, a lid portion 120 including a bar coded shipping label 130 (air bill), and one or more optional carrying handles 140. The shipping tote 100 is shown in FIGS. 1 and 2 as being translucent for purposes of example only. Shipping totes usable with the various embodiments of the invention may or may not be constructed of light permeable materials. The various embodiments are compatible with a variety of different types and brands of shipping totes. Also, though the shipping tote 100 illustrated in FIGS. 1 and 2 is shown as being large enough to accommodate three instrument trays, it should be appreciated that shipping totes usable with the various embodiments of the invention may contain more or less than three surgical instrument trays therein. Furthermore, the air bill 130 may be attached to a hanging tag or label attached to one of the handles 140 or affixed to another location of the tote 100.

In various embodiments, the shipping tote 100 may be manufactured to work with a specific brand or size of instrument tray to reduce motion within the tote 100. In practical application, in an outbound shipping process, an operator will load an empty tote at a distribution center for shipping. Typically, after weighing the contents of the tote 100, an air bill label is generated that provides a unique identification number, such as a tracking number, and that includes information such as a destination address and/or code. After the tote is complete it is set aside in a pick-up location for shipment.

Figure 3:
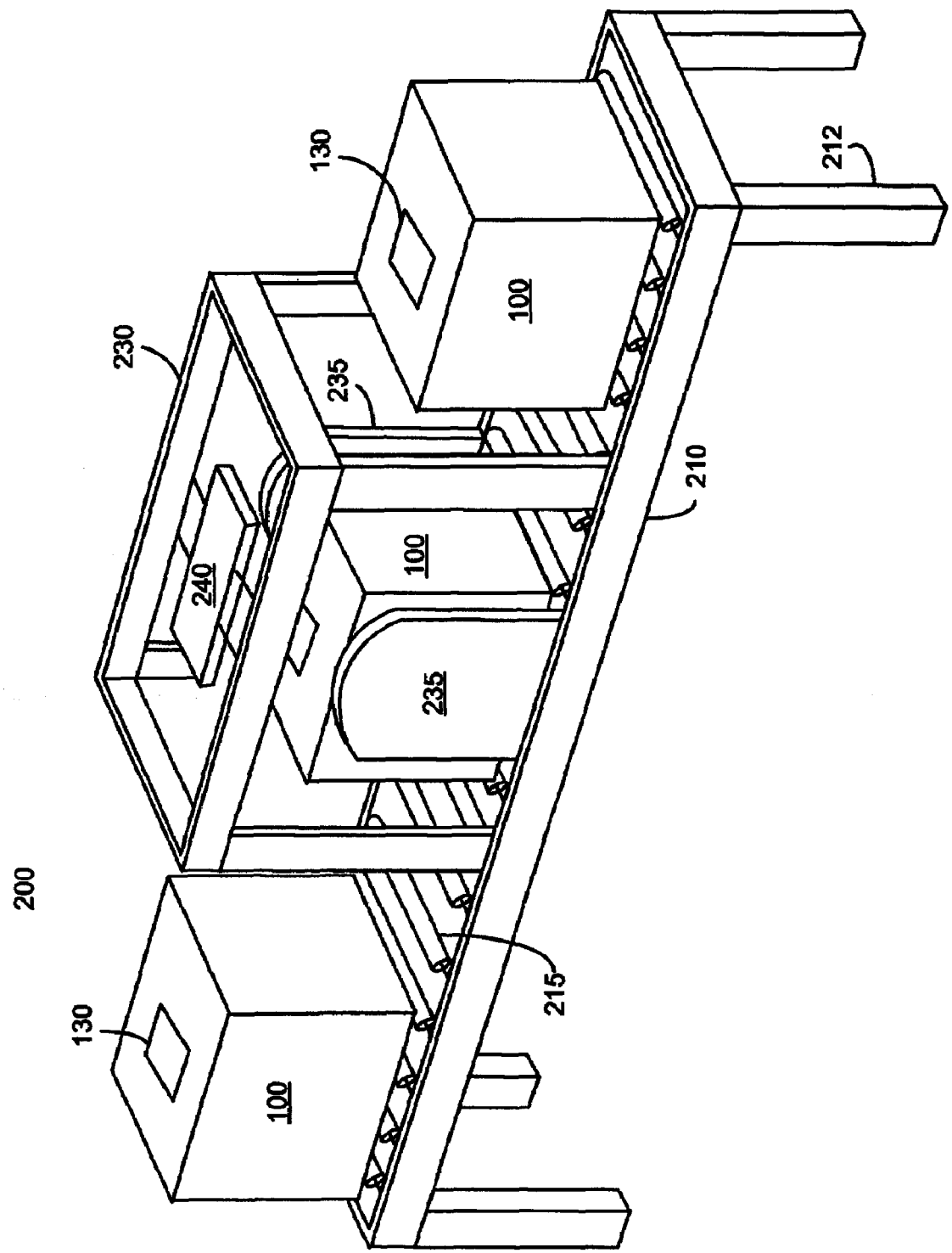
FIG. 3 is a schematic view of a workstation-type RFID-based surgical instrument tray shipping tote processing system usable with the various embodiments of the invention.

Referring now to FIG. 3, a workstation-type pass surgical instrument tray shipping tote, such as that described in the aforementioned U.S. patent application Ser. No. 10/993,487, is depicted. The control system according to various embodiments of the invention may utilize such a workstation reader to receive RFID input information from RFID-tagged surgical instrument trays contained within shipping totes passed along the conveyor path through the reader tunnel. It should be appreciated that hand-held or other types of RFID readers may be used to obtain RFID input data in accordance with the various embodiments of the invention. While in a preferred embodiment, because of the gains in efficiency, the RFID reader is a pass through-type reader large enough to pass a shipping tote, it should be appreciated that such an RFID reader is not required. Other reader configurations including hand held readers may be utilized without departing from the spirit or scope of the invention. For a complete discussion of the pass-through type reader refer to the 10/993,487 application.

Figure 4:
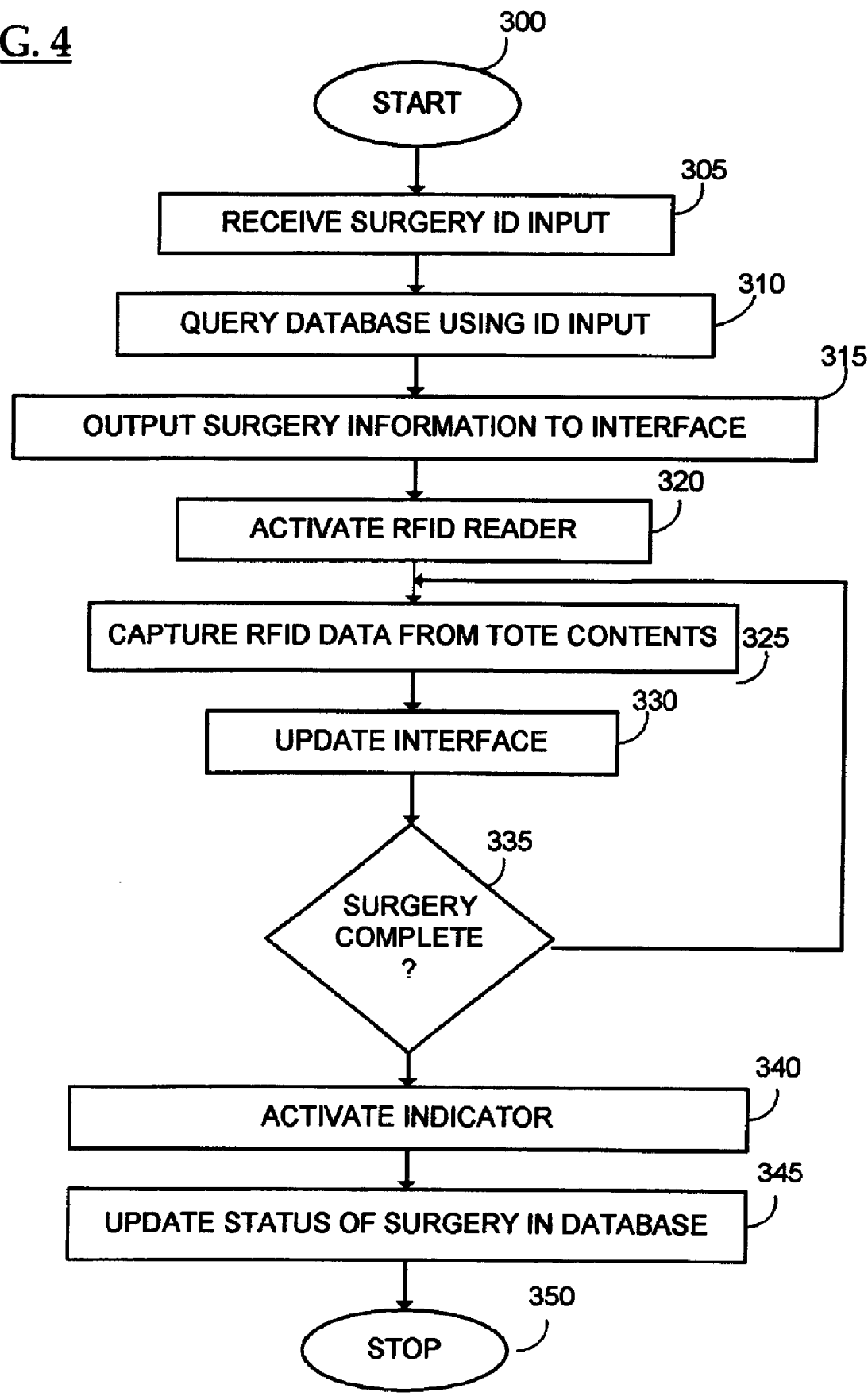
FIG. 4 is a flow chart detailing the steps of a method performed by a control system for an RFID-based system for assembling and verifying outbound surgical equipment corresponding to a particular surgery according to at least one embodiment of this invention.

Referring now to FIG. 4, a flow chart detailing the steps of a method performed by a control system for an RFID-based control system for assembling and verifying outbound surgical equipment corresponding to a particular surgery according to at least one embodiment of this invention is illustrated. The method begins in step 300 and proceeds to step 305 where a surgery ID input is received by the system. In various embodiments, this input may be received via a bar code scanner, a keyboard, a mouse selection, an RFID-based input, an other wireless input, or via another electronic input device. Next, in step 310, in response to this input, the control system queries a database accessible by the control system using the ID input. In various embodiments this may also comprise querying a remote database accessible through a communication module. In various embodiments the database may be an enterprise resource planning (ERP) system accessed using an application program interface (API) that allows the control system to interact with the native database language of the ERP system. ERP systems are management information systems that integrate and automate business practices associated with the operations and/or production aspects of a company. ERP systems typically handle aspects such as manufacturing, logistics, distribution, inventory, shipping, invoicing and accounting for a company. ERP software can aid in the control of business activities such as sales, delivery, billing, production, inventory management and human resources management. ERPs are cross-functional and enterprise wide. That is, all functional departments that are involved in operations or production are integrated into one system.

In the context of the present invention, the ERP system would maintain a record of the current surgery. This record may include information such as the location of the surgery, surgical equipment, including instrument trays and other required equipment, and a date for delivery. By integrating the outbound shipping process with the ERP system, a single system may be used to maintain the current status of equipment associated with a surgery at all times.

After querying the database in step 310, the method proceeds to step 315, where information obtained during the querying process is output. In various embodiments, this may comprise outputting the information to a software window on a display device as is discussed in greater detail in the context of FIGS. 5-7. In various embodiments, this may also comprise printing out a report or sending the information to another appropriate user interface device.

After outputting the information in step 315, operation of the method proceeds to step 320 where an RFID reader is activated. As discussed above, this may comprise activating a pass through-type reader that allows an operator to push a shipping tote along a conveyor path through a RF tunnel containing an RF field strong enough to activate RFID tags associated with surgical instrument trays located inside the shipping tote. Next, in step 325, data read from RFID tags in the current shipping tote is captured by the control system. In various embodiments, as discussed in the context of FIGS. 5-7, when data is obtained from the instrument trays in the current tote using the RFID reader, the output will be updated to reflect that those trays are now present. Next, in step 335, a decision is made as to whether or not the current surgery is complete—that is, has identification for all expected instrument trays been acquired by the RFID reader. If so, operation proceeds to step 340. Otherwise, if not, operation returns to step 325, where identification data from the next shipping tote for the current surgery is acquired and the process is repeated until all shipping totes for the current surgery have been read.

It should be appreciated that in some instances a surgery may be determined in step 335 to be incomplete even though all shipping totes have been read by the RFID reader. For example, if an expected instrument tray is missing from one of the totes, than the system will continue to indicate that the current surgery is incomplete. This may require the operator to obtain the missing tray and pass it through the reader. In another example, an extra instrument tray may be present. In various embodiments, the extra tray will be identified on the interface by the control system, but the system will none the less indicate that the surgery is complete.

With continued reference to the flow chart of FIG. 4, after the system has decided that the surgery is complete, the control system activates an indicator in step 340. In various embodiments, this may comprise changing a status on a user interface. In various other embodiments, this may comprise illuminating an indicator such as a green light or LED. Once the system has activated this indicator, the operator may place air bills on the totes for the current surgery and set them aside for outbound pickup. In step 345, the control system updates the database to reflect that the surgery has shipped and that all surgical instrument trays in the current surgery have been inventoried out to the intended recipient of the shipment. The method ends in step 350.

Figure 5:
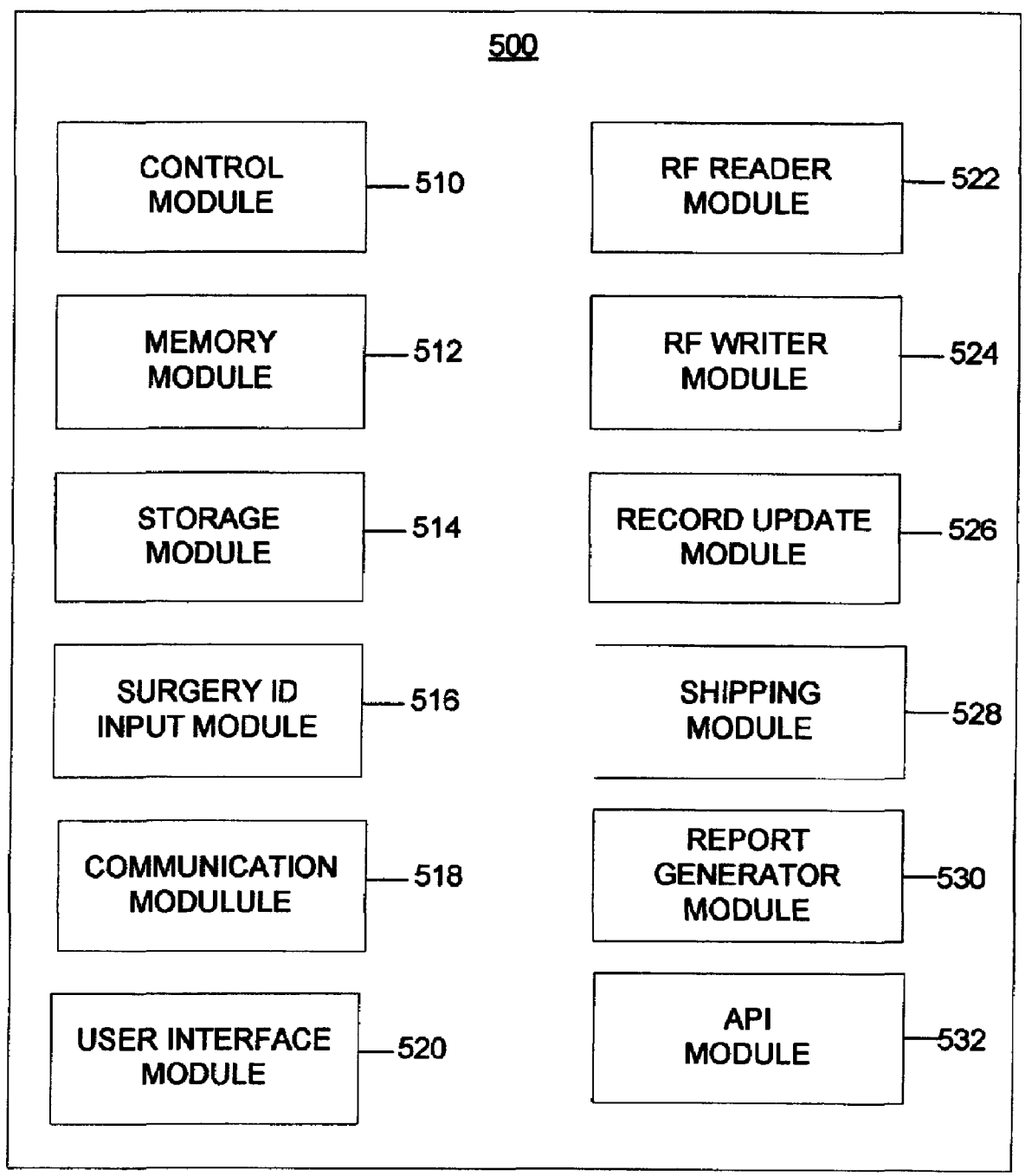
FIG. 5 is a block diagram illustrating modules of a control system for assembling and verifying outbound surgical equipment corresponding to a particular surgery according to at least one embodiment of this invention.

Referring now to FIG. 5, a block diagram illustrating modules of a control system for assembling and verifying outbound surgical equipment corresponding to a particular surgery according to at least one embodiment of this invention is illustrated. The control system comprises a plurality of modules including a surgery ID input module 516, a communication module 518, a user interface module 520, an RF reader module 522, an RF writer module 524, a record update module 526, and shipping module 528, a report generation module 530, and an API module 532. Each module may comprise a separate circuit, routine or application, may be based in hardware, in software, or both, may be firmware, may be discrete components of a modular system or merely subroutines/subcomponents of the same system, such as a single computer program stored in a memory structure of a device, such as a computer or other data processor.

In various embodiments, a user will interact with the control system 500 through the user interface module 520. This module 520 may include components such as a keyboard, mouse, stylus, biometric sensor, display screen, and/or other interface that allows an operator to interact with the system such as to input information, issue commands, power the device on an off, perform file management, upgrade software and database information, monitor output, receive feedback and perform other administrative and non-administrative tasks.

In various embodiments, a user will initiate interaction with the control system by inputting a data input to the surgery ID input module 516. In various embodiments, the surgery ID input module 516 module may have its own input device such as a keyboard, barcode scanner, etc. In various other embodiments, this module 516 may receive its input from the user interface module 520. The surgery ID input module 516 will utilize the API module 532 and the communication module 518 to query a database. If a match to the surgery ID exists in the database, the query will result in information being output to the user interface module 520. In various embodiments, this may comprise displaying a software window containing data fields associated with the current surgery. This may include data fields such as the surgery ID number, description fields for expected surgical instrument trays, current surgery status, etc. During operation, these fields will refresh as the control system confirms the presence of the required surgical sets.

Once a data record has been output on the user interface module 520, the RF reader module 522 will activate so that information stored in RFID tags of surgical instrument trays associated with the current surgery can be obtained. As a user passes a shipping tote past the RFID reader, the reader module 522 will receive data from the tags attached to each set. The read information will be captured by the reader module 522 and the reader module 522 will subsequently cause the user interface module 520 to update the displayed information to reflect the detection of the surgical set for which identification information was obtained. If a particular set can not be read, or if the set contains incorrect data, the RF writer module 524 may be used to reprogram that set's tag in an offline process. In various embodiments, the RF reader module 522 may remain activated until identification data has been acquired for all expected surgical sets. From the operator's perspective, this will correspond to the operator having passed all shipping totes for the current surgery by the RFID reader.

When the control system has obtained RFID information on all expected surgical instrument trays for the current surgery the control system 500 will cause the user interface module 520 to output a message and/or update a window to reflect that the current surgery is complete and therefore ready for shipping. IN various embodiments, this may comprise simply updating a status field controlled by the interface module 520. In various other embodiments, this may also comprise activating a separate indicator such as a light, alarm, LED, etc. In various embodiments, the shipping module 528 may automatically print air bill labels for all shipping totes associated with the current surgery. Alternatively, the shipping module 528 may activate an external shipping system and causes airbill labels to be generated and printed for each shipping tote associated with the current surgery. In various embodiments, the record update module 526 will automatically update the database to reflect the status of the current surgery as complete and to inventory out all instrument sets associated with the current surgery to the intended recipient. The record update module 526 may invoke the communication module 518 and API module 532 to facilitate to transferring the updated data record for the current surgery and interfacing with the database's native format.

The report generator module 530 may generate a paper and/or electronic report of the data processing operations performed by the control system with respect to the current surgery. In various embodiments, the report generation module 534 may be accessed through the user interface module 526 to allow the operator to generate transaction reports, reports on particular instrument trays and instrument tray shipping totes on demand, as well as to generate labels, tags and other documents related to shipping tote processing and/or instrument sets.

FIGS. 6-8 are exemplary screen shots of a user interface software window of a control system for assembling and verifying outbound surgical equipment corresponding to a particular surgery according to at least one embodiment of this invention. In window 600 of these Figures, a plurality of surgery specific field label/value pairs are provided including: surgery number; current shipping status; expected air bills 1-5; a tote read count; a trays per current tote count; ID number, name and status for expected sets 1-12; and fields 1-5 set for sets found but not associated to the current surgery 1-5. In various embodiments, the control system according to this invention will be invoked when a user enters a surgical identification number. Upon entry and subsequent database query, the fields of the window 600 will be populated with the data stored in association with that surgery ID number. In the example of FIG. 6, upon entry of surgery number 123456 a data record is returned and output to the window 600 including information expected to correspond to that surgery. In this example, there are three expected air bills for three shipping totes, and a total of nine expected surgical instrument sets. The tote read count is zero and the surgery status field is incomplete. In various embodiments, the screen will appear in a different color while the surgery status is incomplete and individual fields, such as expected set fields, will change color or shading as they are detected by the RFID reader.

With specific reference to FIG. 7, the window in this Figure reflects that the operator has passed one of the three shipping totes by the RFID reader and the control system has obtained identification information for three RFID tagged surgical instrument trays contained inside the tote—the shipping tote having airbill number 5621101. The set ID entries for sets 3, 4 and 9 are now highlighted, the totes read count is incremented to 1 and the trays per current tote registers 3. In the example of FIG. 7 the first air bill number has also been highlighted. In various embodiments, if the tote has already been weighed, and an air bill number has been generated, the user may enter the air bill number through a user interface to the control system. In various other embodiments, a bar code reader may be attached to or in communication with the control system and may acquire the air bill number automatically when the tote is passed by the RFID reader or, alternatively, by operator scanning of the bar coded air bill.

If a tagged instrument set was contained in the current shipping tote that did not correspond to the current surgery, as evidenced by the RFID reader obtaining an unexpected set ID number, the control system will populate the fields at the bottom of window 600 with the ID number and name of that tray so that the operator can take appropriate action such as removing the set from the tote. Also, if, after scanning all the totes with the RFID reader, a set is still missing, this will be indicated by the control system by one of the expected sets remaining unhighlighted and the current shipping status remaining incomplete.

FIG. 8 shows the exemplary window 600 after the control system has indicated that the current surgery is complete—that is, after all expected sets have been detected. All air bill number fields and expected set fields are highlighted and the current shipping status is updated to complete. In various embodiments, this information may be written as a data record to a database, business intelligence system or ERP system so that the status of the current surgery will be updated as shipped and the surgical sets included in the shipment are inventoried out to the intended recipient. As noted herein, air bill labels may be automatically printed if not already done.

The embodiments of the present inventions are not to be limited in scope by the specific embodiments described herein. For example, although many of the embodiments disclosed herein have been described with reference to processing outbound surgical instrument tray shipping totes corresponding to a surgery, and control and/or operating systems for such systems, the principles herein are equally applicable to other aspects radio frequency-based surgical instrument tray processing and identification. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

What is claimed:

1. A system for assembling and verifying outbound surgical equipment corresponding to a particular surgery comprising: a data processor that receives a data input comprising an identification number of a surgical procedure; a communications link coupled to the data processor that queries a database using at least the identification number of the surgical procedure; a user interface that displays information corresponding to surgical equipment required for that surgical procedure; a container adapted to contain the corresponding surgical equipment; an RFID reader that reads identification information from RFID tags attached to the surgical equipment and to supply the read information to the data processor; and a status indicator that provides a status indication to a user, wherein the status indicator indicates to a user a status of the surgical equipment for the surgical procedure based on a determination by the data processor.

2. The system according to claim 1, wherein the data input is received via at least one data input device selected from the group consisting of a bar code scanner, a key board, a touch screen, an RFID reader, a keyboard, and combinations thereof.

3. The system according to claim 1, wherein the database comprises an enterprise resource planning (ERP) software system that contains data on multiple surgical procedures and surgical equipment required for those procedures.

4. The system according to claim 1, wherein the surgical equipment comprises one or more surgical instrument sets each containing one or more surgical instruments.

5. The system according to claim 4, wherein each of the one or more surgical instrument sets comprises an RFID tag containing programmable information associated with that set.

6. The system according to claim 1, wherein the user interface comprises a display device displaying a software window that lists a name and an identification number of each item of surgical equipment required for the current surgical procedure.

7. The system according to claim 6, wherein the container comprises a surgical instrument set shipping tote into which an operator loads the required surgical equipment.

8. The system according to claim 1, wherein the RFID reader is a pass-through-type reader station.

9. The system according to claim 1, wherein the data processor is that compares the read identification information to the displayed information corresponding to surgical equipment required for that surgical procedure.

10. The system according to claim 1, wherein the status determination by the data processor comprises a determination of at least one status selected from the group consisting of surgery complete, surgical equipment missing, incorrect surgical equipment present and superfluous surgical equipment present.

11. The system according to claim 10, wherein the status indicator is adapted to alert a user whether the surgery is complete and ready for shipping or whether exception handling is required.

12. The system according to claim 11, further comprising a shipping rate calculator and shipping air bill printer for printing a shipping label for the container.

13. The system according to claim 11, wherein the communication link is further that updates the database to reflect a complete status for the surgical procedure after a surgery complete status is indicated.

14. A computer readable storage medium containing computer readable instructions stored therein for operating a system for assembling and verifying outbound surgical equipment corresponding to a particular surgery, the instructions comprising: instructions for receiving a first data input identifying a surgical procedure; instructions for querying a database using the first data input; instructions for outputting a list of surgical equipment associated with the particular surgery; instructions for activating an RFID reader to read identification information from surgical equipment placed in proximity to the RFID reader; instructions for corn paring the identification information with identification information associated with the list of surgical equipment; and instructions for activating an indicator based on a results of comparing.

15. The computer readable storage medium according to claim 14, wherein the instructions for querying a status database comprise instructions for querying a database system using a surgical procedure identification number and for retrieving identification information including at least a name and identification number of each item of surgical equipment associated with the surgical procedure identification number in the database.

16. The computer readable storage medium according to claim 15, wherein the instructions for querying a status database comprise instructions for querying an ERP software system.

17. The computer readable storage medium according to claim 14, wherein the instructions for comparing the identification information with identification information associated with the list of surgical equipment comprises instructions for determining if all expected surgical equipment is present, if one or more items of surgical equipment are missing, or if unexpected items of surgical equipment are present.

18. The computer readable storage medium according to claim 14, wherein the instructions for activating an indicator comprise instructions for activating an indicator to indicate either that the surgery is complete or that exception handling is required.

19. The computer readable storage medium according to claim 14, further comprising instructions for updating the database to reflect that the surgical equipment has been inventoried out after a status of surgery complete has been indicated.

20. A control system for a system for assembling and verifying outbound surgical equipment corresponding to a particular surgical procedure comprising: a data input module for receiving a user input indicative of a identification number of a surgical procedure; a database module storing a plurality of surgical procedures and a list of surgical equipment associated with each procedure; a data processor module that queries the database module using the data input to determine a list of required surgical equipment; an output module that outputs the list of surgical equipment so that a user can pick the required equipment; an RFID reader module that acquires identification information from RFID tags associated with each item of surgical equipment and to provide the identification information to the data processor module to be compared against identification information of equipment on the list; and a status indication module that outputs a status of the surgical procedure based on results of the comparison, wherein the status indicates whether the surgical procedure is ready for shipping or that exception handling is required.

* * * * *